US005614681A

United States Patent [19]

Tada

[11] Patent Number: 5,614,681

[45] Date of Patent: Mar. 25, 1997

[54] KARMAN VORTEX FLOW METER

[75] Inventor: Yasuo Tada, Hyogo, Japan

[73] Assignee: Mitsubishi Denki Kabushiki Kaisha, Tokyo, Japan

[21] Appl. No.: 553,832

[22] Filed: Nov. 6, 1995

[30] Foreign Application Priority Data

Apr. 26, 1995 [JP] Japan .................................... 7-127337

[51] Int. Cl.[6] ................................ G01F 1/32; G01F 1/68

[52] U.S. Cl. ........................................... 73/861.22; 73/202

[58] Field of Search ................................ 73/861.22, 202, 73/202.5, 118.2

[56] References Cited

U.S. PATENT DOCUMENTS 4,299,121 11/1981 Asayama et al. .................... 73/861.22
4,683,760 8/1987 Misumi ............................... 73/861.22

FOREIGN PATENT DOCUMENTS 57-17864 1/1982 Japan ................................ G01P 5/01
57-86013 5/1982 Japan ................................ G01F 1/32
5-84825 11/1993 Japan ................................ G01F 1/32

*Primary Examiner*—Richard Chilcot
*Assistant Examiner*—Harshad Patel
*Attorney, Agent, or Firm*—Sughrue, Mion, Zinn, Macpeak & Seas

[57] ABSTRACT

A Karman vortex flow meter has a detection passages located along a fluid flow in a duct 1. Flow outlets of the detection passage are disposed on an end face of a vortex generation element and flow inlets 3 are disposed upstream from the flow outlets. Heating coils for detecting flow velocity change of a fluid caused by a negative pressure of a Karman vortex are mounted in the detection passage, and swell portions are formed upstream from the heating coils in the detection passage. The flow meter that can prevent water drops, bubbles, etc., from adhering to heating coils, etc., and detect Karman vortexes stably.

9 Claims, 5 Drawing Sheets

KARMAN VORTEX FLOW METER

BACKGROUND OF THE INVENTION

1. Field of the Invention

This invention relates to a Karman vortex flow meter used with internal combustion engines of vehicles, etc., for measuring the flow velocity and quantity of a fluid and in particular to a method using heating coils, etc., for detecting Karman vortexes.

2. Description of Related Art

The methods using heating coils for detecting Karman vortexes are those for detecting Karman vortexes occurring on a fluid directly by means of heating coils and for detecting a subflow produced by alternately occurring Karman vortexes.

The former method is described, for example, in Unexamined Japanese Patent Publication 57-86013 (1982) as shown in FIG. 7 and the latter is described, for example, in Unexamined Japanese Patent Publication 57-17864 (1982) as shown in FIG. 8.

In FIG. 7, a vortex generation element 102 is installed in a duct 101 where a fluid flows and heating coils **109*a* and 109*b* are placed symmetrically in a vortex pass area downstream from the vortex generation element 102. In the structure, Karman vortexes 107 produced by a fluid flow indicated by an arrow 110 are detected as an increase or decrease in a heating current fed into the heating coils 109*a* and 109*b*** for measuring the flow velocity or quantity according to the Karman vortex period.

In FIG. 8, a heating coil is put in a through hole 250 piercing both sides of a vortex generation element 202 installed in a duct 101 where a fluid flows, and a flow produced in the through hole 250 as Karman vortexes 207 occur is converted into an AC signal synchronized with the vortex occurrence using a radiation amount change of the heating coil 209. The flow velocity or quantity is measured from the frequency or period of the AC signal.

The conventional Karman vortex flow meters introduce the following problems:

If heating coils are installed directly in the duct through which a fluid passes as shown in FIG. 7, when the fluid contains dust, the dust will accumulate in the heating coils as the flow meter is used for a long term. Since the accumulated dust hinders the heating coils in heat radiation, electric output of the heating coils decreases and in the end, Karman vortexes cannot be detected.

If two holes are made on the side faces of the vortex generation element and the through passage is disposed so as to connect the holes as shown in FIG. 8, Karman vortexes alternately occurring via the through passage interfere with each other, causing Karman vortexes to sometimes occur unstably.

To solve the problems, a Karman vortex flow meter as shown in FIGS. 9A and 9B has been proposed.

In FIGS. 9A and 9B, a vortex generation element 2 for generating Karman vortexes is installed in a duct 1 into which a fluid flows and detection passages 5 are disposed along the fluid flow in the duct 1. Each detection passage 5 has a flow outlet 4 formed in the end face of the vortex generation element 2 and a flow inlet 3 formed in the top wall face of the duct 1 upstream from the flow outlet 4. Further, heating coils 9 for detecting a flow velocity change in the detection passages 5 caused by a negative pressure of a Karman vortex and supports 8 for supporting the heating coils 9 are located in the detection passages 5.

The above mentioned Karman vortex flow meter is described in detail in a copending U.S. patent application No. 08/553,901, filed on Nov. 6, 1996.

The Karman vortex flow meter of the structure in FIG. 9 can prevent dust having a heavy specific gravity from flowing into the detection passages 5; however, if the fluid contains water drops or bubbles having a comparatively light specific gravity, the water drops or bubbles enter the detection passages. Residence of the water drops or bubbles can hinder the heating coils from detecting Karman vortexes or fuse the heating coils.

SUMMARY OF THE INVENTION

It is therefore an object of the invention to provide an improvement in the Karman vortex flow meter shown in FIG. 9 and more particularly to a Karman vortex flow meter which, even if the fluid to be measured contains water drops or bubbles, can prevent the water drops or bubbles from flowing into a detection passage and always detect Karman vortexes stably.

According to the invention, there is provided a Karman vortex flow meter comprising a detection passage being arranged along a duct in which a vortex generation element is installed and having a flow outlet disposed on an end face of the vortex generation element and a flow inlet disposed on a wall face of the duct upstream from the flow outlet, detection means being placed in the detection passage for detecting a flow velocity change of a fluid in the detection passage caused by a negative pressure of the Karman vortex, and a swell portion being formed upstream from the detection means.

The flow inlet of the detection passage is disposed on a wall face on a top of the duct, the swell portion is formed just above the flow inlet, and a lower face of the swell portion communicated with the flow inlet is formed like a taper.

Further, a water repelling filter is installed in the swell portion.

Further, the exit of the-swell portion from which a fluid flows out does not face the entrance of the swell portion into which a fluid flows and is projected from a wall face of the swell portion.

Further the flow inlet of the detection passage is made up of a plurality of holes each having a passage diameter smaller than a passage diameter of the detection passage.

Further, the total passage area of the holes is made larger than the passage area of the detection passage.

According to the invention, there is provided a Karman vortex flow meter comprising a detection passage being arranged along a duct in which a vortex generation element is installed and having a flow outlet disposed on an end face of the vortex generation element and a flow inlet disposed on a wall face of the duct upstream from the flow outlet, and detection means being placed in the detection passage for detecting a flow velocity change of a fluid in the detection passage caused by a negative pressure of the Karman vortex, the flow inlet of the detection passage being made up of a plurality of holes each having a passage diameter smaller than a passage diameter of the detection passage.

A heating coil is mounted as means for detecting a flow velocity in the detection passage and a flow velocity is measured in response to a current change of the heating coil.

According to the above described invention, when a fluid containing water drops or bubbles is caused to flow into the Karman vortex flow meter having the structure, the fluid also passes through the detection passage as it passes through the duct. At this time, the water drops or bubbles in the fluid also pass through the flow inlet. When the water drops or bubbles passing through the flow inlet arrive at the swell portion, the flow velocity once slows down. Thus, the water drops or bubbles are trapped in the swell portion and most of them stop here.

The water drops or bubbles trapped on the taper-like bottom of the swell portion are discharged by gravity from the flow inlet when inflow of the fluid stops.

Further, if the swell portion is provided with a water repelling filter, it becomes harder for water drops or bubbles to enter the detection passage.

A guiding inlet projecting from the swell portion wall face is formed, whereby the water drops or bubbles trapped on the top wall face of the swell portion do not flow into the depth of the detection passage.

If the passage area of the flow inlet is small, water drops or bubbles become hard to pass through the flow inlet. Therefore, a plurality of flow inlets are formed as smaller holes than the detection passage, whereby water drops or bubbles are hard to enter the detection passage.

If the sum of the passage areas of the flow inlets (holes) is made larger than the detection passage area, detection of Karman vortexes is not hindered.

Further, water drops or bubbles do not flow into the detection passage simply by making up the flow inlet of the detection passage of a plurality of holes each having a passage diameter smaller than the passage diameter of the detection passage.

A larger electric signal can be provided by using a heating coil.

DETAILED DESCRIPTION OF PREFERRED EMBODIMENTS

Figure 1A:
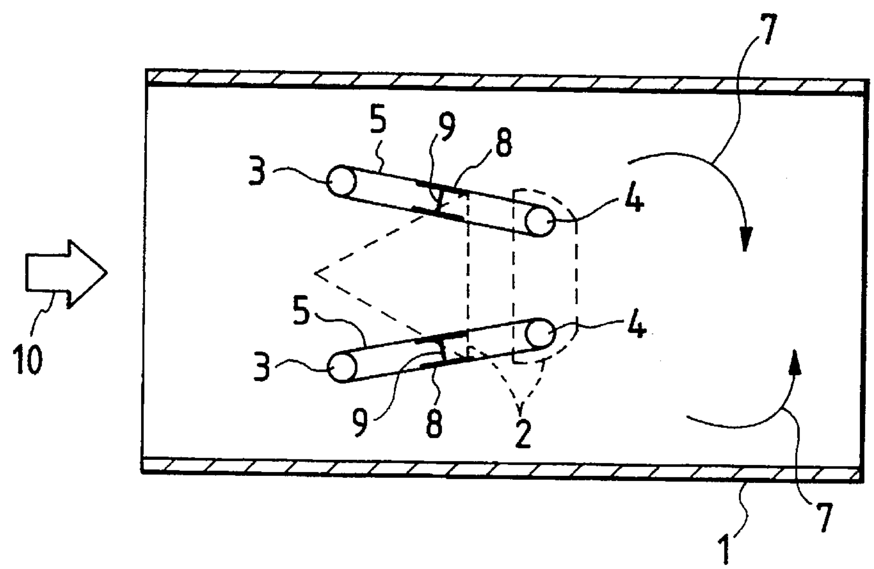
FIGS. 1A and 1B are a plan view and a sectional side view showing a Karman vortex flow meter according to a first embodiment of the invention.
Figure 1B:
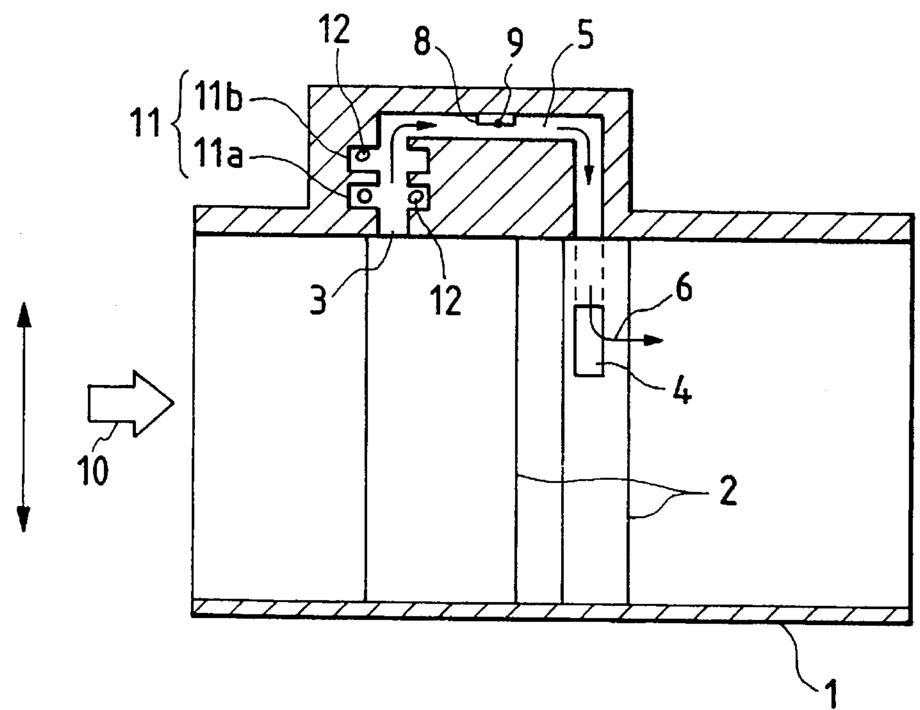

First embodiment:

FIGS. 1A and 1B are a plan view and a sectional side view showing a Karman vortex flow meter according to a first embodiment of the invention.

In FIG. 1, a vortex generation element 2 is vertically installed in a duct into which a fluid indicated by an arrow 10 flows and detection passages 5 having flow outlets 4 on side faces of the vortex generation element 2 and flow inlets 3 on top wall faces of the duct 1 upstream from the flow outlets 4 are disposed substantially in parallel with a flow in the duct 1.

The detection passages 5 contain supports 8 on which heating coils 9 are put. Swell portions 11*a* and 11*b* are formed upstream from the heating coils 9 in the detection passages 5.

In the Karman vortex flow meter having the structure, when a fluid flows into the duct 1 in the direction of the arrow 10, Karman vortexes 7 occur on the rear of the vortex generation element 2. Assuming that a Karman vortex 7 occurs at the flow outlet 4, a negative pressure is applied around the flow outlet 4, whereby the fluid flows into the detection passage 5 through the flow inlet 3 higher in pressure than the flow outlet 4. The heating coil 9 detects the fluid flow in the detection passage 5. At this time, water drops or bubbles 12 contained in the gas also flow into the detection passage 5 with the inflow of the fluid through the flow inlet 3. When the water drops or bubbles passed through the flow inlet 3 arrive at the first swell portion 11*a*, the flow velocity lowers, thus the water drops or bubbles 12 are trapped in the first swell portion 11*a*. Water drops or bubbles 12 not trapped by the first swell portion 11*a* are trapped in the second swell portion 11*b*.

When the fluid thus reaches the heating coil 9, the water drops or bubbles 12 in the fluid disappear or little exist. Therefore, the water drops or bubbles do not adhere to the heating coil 9 or the support 8 or little adhere thereto if they adhere; detection of a fluid (gas) flow is not hindered.

If the fluid contains a small amount of water drops or bubbles 12, only one swell portion 11 may be formed; if it contains a large amount of water drops or bubbles 12, three or more swell portions 11 may be formed.

Figure 2:
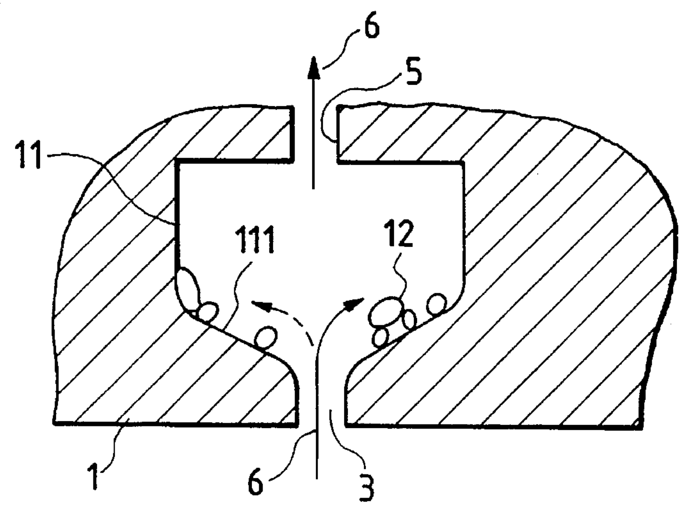
FIG. 2 is a fragmentary sectional view showing a swell portion of a detection passage according to a second embodiment of the invention.

Second embodiment:

FIG. 2 shows a swell portion of a detection passage according to a second embodiment of the invention.

In the figure, numeral 111 is a taper-like lower face of a swell portion 11 formed upstream from a detection passage 5. Parts identical with or similar to those previously described with reference to FIG. 1 are denoted by the same reference numerals in FIG. 2 and will not be discussed again.

In the structure, since the flow velocity of a fluid flowing in through a flow inlet 3 lowers at the swell portion 11, a flow line indicated by an arrow 6 is drawn. Thus, water drops or bubbles 12 in the fluid having a heavy specific gravity stay in the swell portion 11 and soon adhere to the lower face 111 as shown in FIG. 2. When the amount of the water drops or bubbles 12 adhering to the lower face 111 increases and no fluid flows in, the water drops or bubbles 12 on the lower face 111 are discharged by gravity from the flow inlet 3 along the taper face of the lower face 111.

Figure 3:
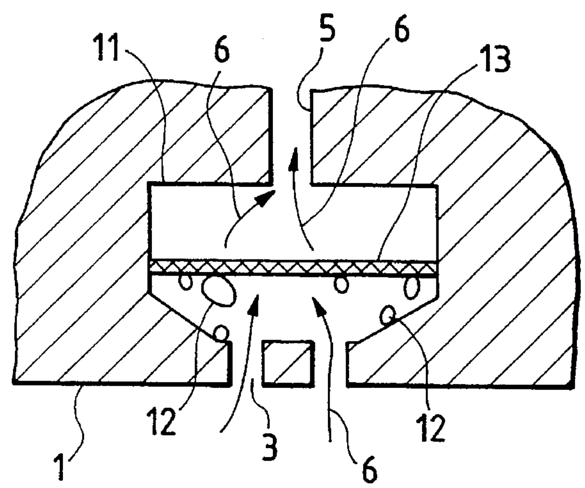
FIG. 3 is a fragmentary sectional view showing a swell portion of a detection passage according to a third embodiment of the invention.

Third embodiment:

FIG. 3 shows a swell portion of a detection passage according to a third embodiment of the invention.

In the figure, a water repelling filter 13 is installed in a swell portion 11. Parts identical with or similar to those previously described with reference to FIG. 2 are denoted by the same reference numerals in FIG. 3.

In the structure, water drops or bubbles 12 flowing into the swell portion 11 are trapped not only on the wall face of the swell portion 11 as the flow velocity lowers as in FIG. 2, but also by the water repelling filter. Therefore, water drops or bubbles 12 do not flow into the detection passage 5.

Figure 4:
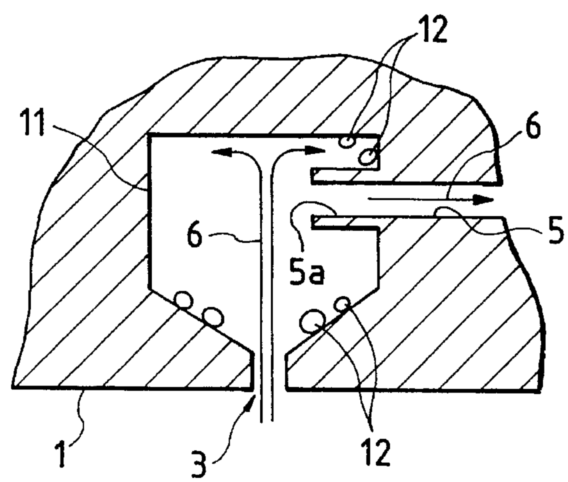
FIG. 4 is a fragmentary sectional view showing a swell portion of a detection passage according to a fourth embodiment of the invention.

Fourth embodiment:

FIG. 4 shows a swell portion of a detection passage according to a fourth embodiment of the invention.

In the figure, a detection passage 5 has a guiding inlet 5*a* projecting toward the inside from the wall face not opposed to a flow inlet 3 of the swell portion 11.

In the fourth embodiment, water drops or bubbles 12 flowing into the swell portion 11 are trapped on the wall face of the swell portion 11 as in FIG. 2, but the water drops or bubbles 12 trapped on the upper side than the guiding inlet 5*a* of the detection passage 5 do not flow into the detection passage 5 because the guiding inlet 5*a* projects from the wall face of the swell portion.

Figure 5:
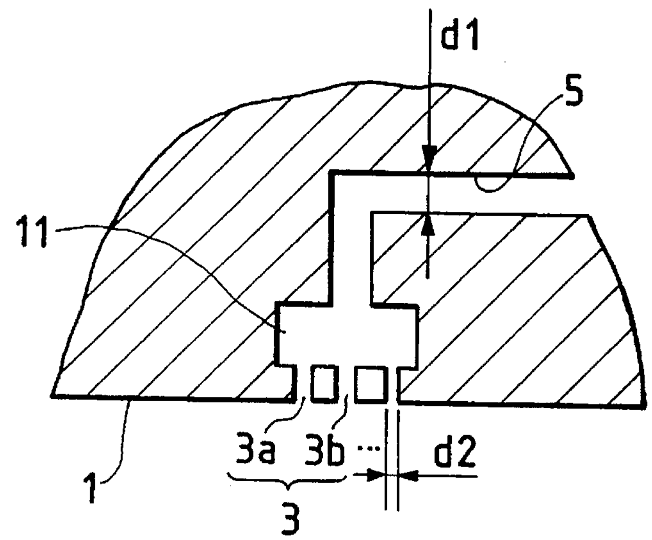
FIG. 5 is a fragmentary sectional view showing a swell portion of a detection passage according to a fifth embodiment of the invention.

Fifth embodiment:

FIG. 5 shows a swell portion of a detection passage according to a fifth embodiment of the invention.

In the figure, flow inlets 3 consist of inlets 3*a*, 3*b*, . . . each having a passage diameter d2 smaller than a passage diameter d1 of a detection passage 5. Water drops or bubbles 12 contained in a fluid have various particle sizes. Thus, the smaller the passage diameter d2 of the flow inlet 3*a*, 3*b*, . . . , the fewer the amount of water drops or bubbles 12 passing through the flow inlet. If the total area of the flow inlets 3*a*, 3*b*, . . . is larger than the area of the detection passage 5, a fluid flow occurring in the detection passage 5 caused by Karman vortexes is not hindered.

Figure 6:
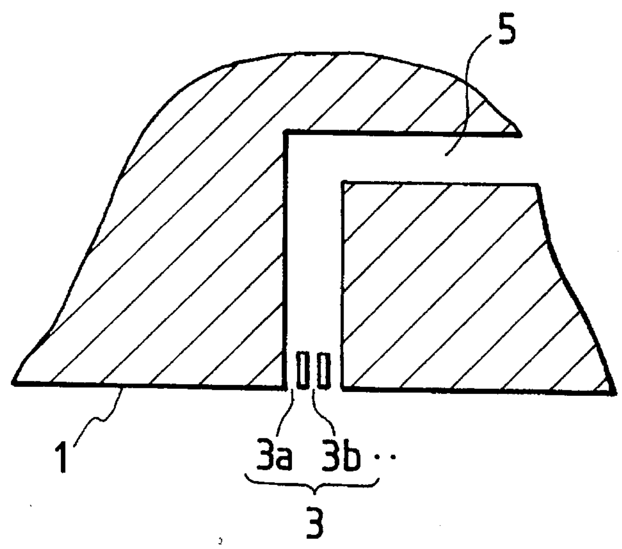
FIG. 6 is a fragmentary sectional view showing a detection passage according to a sixth embodiment of the invention.
Figure 7:
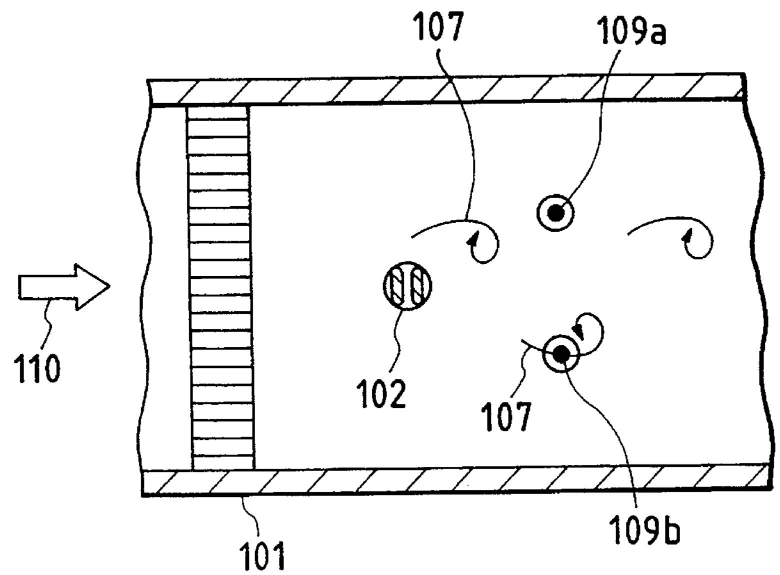
FIG. 7 is a view showing a conventional Karman vortex flow meter.
Figure 8:
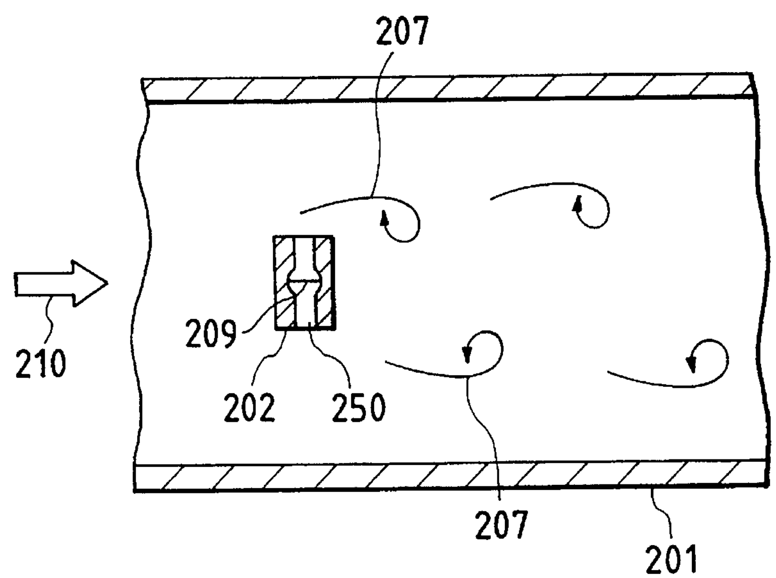
FIG. 8 is a view showing a conventional Karman vortex flow meter.
Figure 9A:
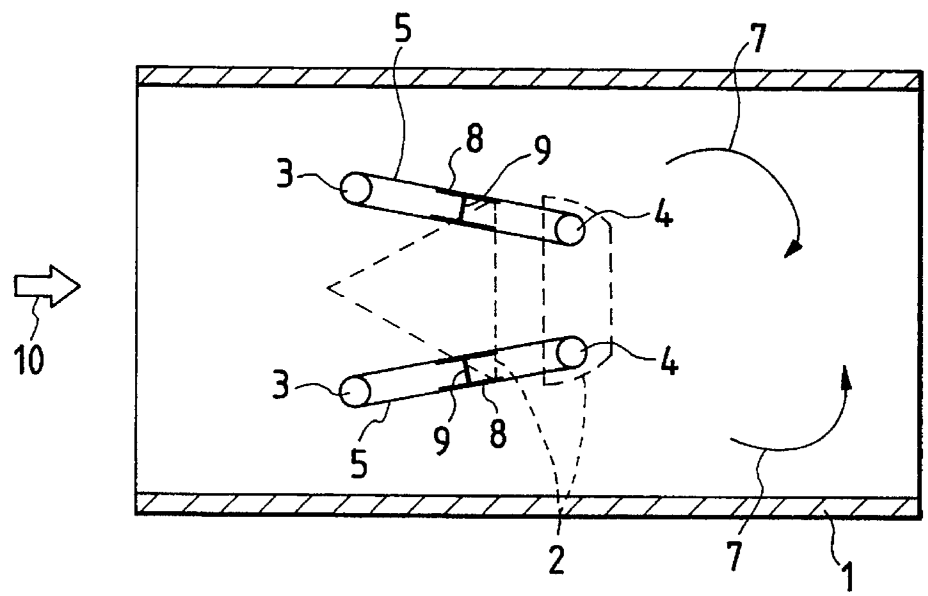
FIGS. 9A and 9B are a plan view and a sectional side view showing a Karman vortex flow meter related to the invention.
Figure 9B:
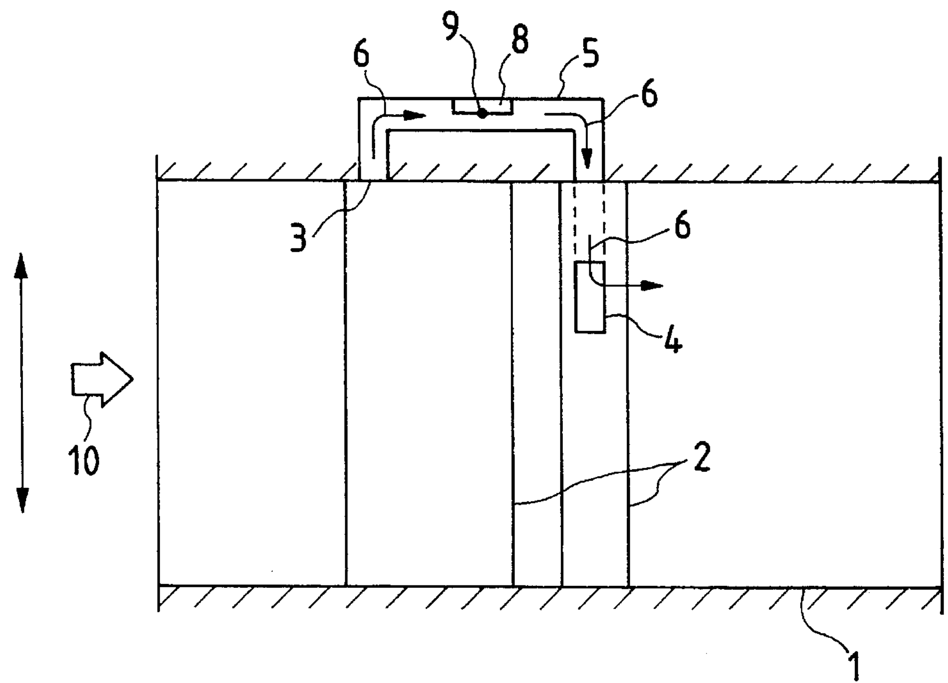

Sixth embodiment:

FIG. 6 shows a flow inlet of a detection passage according to a sixth embodiment of the invention.

In the figure, a plurality of flow inlets 3 are communicated directly with a detection passage 5 and no swell portion is formed. If the flow inlets 3 are sufficiently small as in FIG. 6, water drops or bubbles 12 do not flow into the detection passage 5 as in FIG. 5. However, since the total area of the flow inlets 3 is not larger than the area of the detection passage 5, a fluid flow occurring in the detection passage 5 caused by Karman vortexes is a little hindered.

According to the invention, since water drops or bubbles passing through the flow inlet are trapped in the swell portion, water drops or bubbles flowing into the detection passage decrease, not adversely affecting detection of a fluid flow in the detection passage; stable flow quantity detection is enabled.

According to the invention, the flow inlet of the detection passage is disposed on the top of the dust, the wall face of the swell portion on the flow inlet side is formed like a taper, and the swell portion is formed just above the flow inlet, whereby the water drops or bubbles passing through the flow inlet can be trapped in the swell portion for preventing them from flowing into the detection passage, and the trapped water drops or bubbles can also be discharged by gravity from the flow inlet when inflow of the fluid stops.

According to the invention, the swell portion is provided with the water repelling filter, whereby the trap effect is furthermore improved, making water drops or bubbles hard to enter the detection passage.

According to the invention, a guiding inlet projecting from the swell portion wall face is formed, whereby the water drops or bubbles trapped on the top wall face of the swell portion do not flow into the depth of the detection passage.

According to the invention, a plurality of flow inlets are formed as smaller holes than the diameter of the detection passage, whereby water drops or bubbles becomes extremely hard to enter the detection passage.

According to the invention, since the sum total of the passage areas of the flow inlets (holes) is made larger than the detection passage area, a fluid flow in the detection passage is not hindered and detection of Karman vortexes is not affected.

According to the invention, water drops or bubbles become hard to flow into the detection passage simply by making up the flow inlet of the detection passage of a plurality of holes each having a passage diameter smaller than the passage diameter of the detection passage.

According to the invention, a larger electric signal can be provided by using a heating coil.

What is claimed is:

1. A Karman vortex flow meter for detecting a period of Karman vortexes to measure a flow velocity or flow rate, said flow meter comprising:

a duct into which a fluid flows;

a vortex generation element disposed in said duct to produce the Karman vortexes;

a detection passage arranged along a fluid flow in said duct and having a flow outlet disposed on an end face of said vortex generation element and a flow inlet disposed on a wall face of said duct upstream from said flow outlet;

detection means placed in said detection passage for detecting variation of a flow velocity of a fluid in said detection passage caused by a negative pressure of the Karman vortex; and a swell portion formed upstream from said detection means in said detection passage.

2. The Karman vortex flow meter as claimed in claim 1, wherein said flow inlet of said detection passage is disposed on a wall face on a top of said duct, wherein said swell portion is formed just above said flow inlet, and wherein a lower face of said swell portion communicated with said flow inlet is formed as a taper.

3. The Karman vortex flow meter as claimed in claim 1, wherein a water repelling filter is installed in said swell portion.

4. The Karman vortex flow meter as claimed in claim 1, wherein an exit of said swell portion communicated with said detection passage does not face an entrance of said swell portion communicated with said flow inlet and is projected from a wall face of said swell portion.

5. The Karman vortex flow meter as claimed in claim 1, wherein said flow inlet of said detection passage is made up of a plurality of holes each having a passage diameter smaller than a passage diameter of said detection passage.

6. The Karman vortex flow meter as claimed in claim 5 wherein a total passage area of said plurality of holes is larger than a passage area of said detection passage.

7. The Karman vortex flow meter as claimed in claim 1, wherein a heating coil is mounted as means for detecting a flow velocity in said detection passage and a flow velocity is measured in response to a current change of said heating coil.

8. A Karman vortex flow meter for detecting a period of Karman vortexes to measure a flow velocity or flow rate, said flow meter comprising:

a duct into which a fluid flows;

a vortex generation element disposed in said duct to produce the Karman vortexes;

a detection passage arranged along a fluid flow in said duct and having a flow outlet disposed on an end face of said vortex generation element and a flow inlet disposed on a wall face of said duct upstream from said flow outlet; and detection means placed in said detection passage for detecting variation of a flow velocity of a fluid in said detection passage caused by a negative pressure of the Karman vortex, wherein said flow inlet is made up of a plurality of holes each having a passage diameter smaller than a passage diameter of said detection passage.

9. The Karman vortex flow meter as claimed in claim 8, wherein a heating coil is mounted as means for detecting a flow velocity in said detection passage and a flow velocity is measured in response to a current change of said heating coil.

* * * * *